United States Patent
Hourne

(10) Patent No.: US 10,401,242 B2
(45) Date of Patent: Sep. 3, 2019

(54) SENSOR FOR MEASURING THE TORQUE OF A DRIVE SHAFT

(71) Applicants: CONTINENTAL AUTOMOTIVE FRANCE, Toulouse (FR);
CONTINENTAL AUTOMOTIVE GMBH, Hannover (DE)

(72) Inventor: Xavier Hourne, Cugnaux (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 128 days.

(21) Appl. No.: 15/562,213

(22) PCT Filed: Apr. 18, 2016

(86) PCT No.: PCT/EP2016/000629
§ 371 (c)(1),
(2) Date: Sep. 27, 2017

(87) PCT Pub. No.: WO2016/169645
PCT Pub. Date: Oct. 27, 2016

(65) Prior Publication Data
US 2018/0120179 A1    May 3, 2018

(30) Foreign Application Priority Data

Apr. 21, 2015    (FR) .................................. 15 53562

(51) Int. Cl.
*G01L 3/10*    (2006.01)
(52) U.S. Cl.
CPC .................................. *G01L 3/105* (2013.01)

(58) Field of Classification Search
CPC ........................................................ G01L 3/105
See application file for complete search history.

(56) References Cited

U.S. PATENT DOCUMENTS 6,926,115 B2 * 8/2005 Masaki .................... B62D 6/10
180/443
7,028,545 B2 * 4/2006 Gandel .................. G01L 3/104
73/328

(Continued)

FOREIGN PATENT DOCUMENTS

| CN | 102906553 A | 1/2013 |
| CN | 103808443 A | 5/2014 |

(Continued)

OTHER PUBLICATIONS

International Search Report, dated Jul. 11, 2016, from corresponding PCT/EP2016/000629 application.

*Primary Examiner* — Freddie Kirkland, III
(74) *Attorney, Agent, or Firm* — Young & Thompson

(57) ABSTRACT

Disclosed is an assembly formed by a drive shaft for a vehicle and a sensor for measuring the value of a torque applied to the shaft, the sensor including a unit for generating a magnetic field and an arrangement formed by a first coil, a second coil, a third coil and a fourth coil arranged side-by-side between a first toothed wheel of the shaft and a second toothed wheel of the shaft, parallel to the first toothed wheel and to the second toothed wheel, arranged to be immersed in the magnetic field, the overall length of the first coil, of the second coil, of the third coil and of the fourth coil being equal to the period of the first toothed wheel and of the second toothed wheel.

18 Claims, 3 Drawing Sheets

(56) References Cited

U.S. PATENT DOCUMENTS

| | | | |
|---|---|---|---|
| 9,435,703 B2* | 9/2016 | Maehara | B62D 15/02 |
| 10,093,350 B2* | 10/2018 | Lee | B62D 6/10 |
| 2004/0011138 A1 | 1/2004 | Gandel et al. | |
| 2004/0056748 A1 | 3/2004 | Masaki et al. | |
| 2006/0123903 A1 | 6/2006 | Gandel et al. | |
| 2010/0263457 A1 | 10/2010 | Yoneda et al. | |
| 2013/0060490 A1 | 3/2013 | Ameil et al. | |
| 2014/0123770 A1 | 5/2014 | Lee | |

FOREIGN PATENT DOCUMENTS

| | | |
|---|---|---|
| WO | 02/071019 A1 | 9/2002 |
| WO | 2004067215 A2 | 8/2004 |

* cited by examiner

SENSOR FOR MEASURING THE TORQUE OF A DRIVE SHAFT

The invention relates to the field of electronic measurement sensors and relates more particularly to a sensor for measuring the torque applied to a drive shaft.

The invention is notably applicable to measuring the torque of a drive shaft of a motor vehicle and to measuring the torque of a pedal shaft of a cycle, such as, for example, a bicycle.

The torque designates a system of two colinear forces, of opposing directions and of equal intensity. It is characterized by its moment, which is equal to the product of the intensity of one of the forces by the distance which separates the two forces.

It is known practice to use a sensor to measure the torque of a drive shaft mounted in a vehicle such as, for example, a motor vehicle or a cycle. Such a drive shaft can be an engine power transmission shaft, a gearbox shaft, a crank shaft, a pedal shaft, etc.

Such a sensor, known also as "torque meter" or "torque sensor", measures the deformation of the shaft which is subjected to the torque in order to deduce therefrom a value of said torque.

Among these torque sensors, a distinction is drawn between the deformation gauge sensors and the magnetic sensors. In the deformation gauge sensors such as the torque meters with rotating transformers or the torque meters with remote measurement system, a part of the electronics producing the measurement is mounted on the drive shaft. This significantly reduces their robustness and increases their need for maintenance, which presents significant drawbacks.

The magnetic sensors, called "contactless" sensors, make it possible to partly mitigate these drawbacks. Among the magnetic sensors, the torque meters based on a magnetization of the shaft and the torque meters with differential transformers are known.

The torque meters based on a magnetization of the shaft require, by definition, a shaft made of a ferromagnetic material, now, such a shaft does not necessarily meet the conditions of solidity and of reliability of the shafts for motor vehicles or for cycles, the shaft notably being able to lose its magnetization over time, which presents drawbacks.

Regarding the torque meters with differential transformers, the shaft comprises a first portion and a second portion of the same diameter and an intermediate torsion portion, of lesser diameter, joining the first portion and the second portion. This intermediate portion makes it possible to concentrate the torsion generated by a torque applied to the shaft in order to allow the measurement thereof. A first element of the sensor, of cylindrical form, is mounted on the first portion of the shaft and extends partly around the intermediate portion while a second element of the sensor, also of cylindrical form, is mounted on the second portion of the shaft and extends also partly around the intermediate portion such that the first portion, the first element, the second portion and the second element are coaxial and that the first element and the second element cover one another at the intermediate portion. Apertures are formed in the first element of the sensor and in the second element of the sensor and primary and secondary coils are mounted facing one another on either side of the first element of the sensor and of the second element of the sensor. In the absence of torsion applied to the shaft, the apertures of the first element and of the second element do not coincide such that no magnetic field circulates between the primary coils and the secondary coils. Conversely, when the shaft transmits a certain power, the intermediate portion is deformed such that the first element and the second element of the sensor are displaced angularly in relation to one another. This angular displacement leads to an overlapping of the apertures of the first element and of the second element such that a magnetic flux then circulates between the primary coils and the secondary coils in proportion to the torque applied to the shaft. Manufacturing such a sensor is however complex and time-consuming, particularly through the necessary arrangement and alignment between the primary coils, the secondary coils, the apertures, the first element of the sensor and the second element of the sensor, which presents significant drawbacks. In particular, the mounting by overlapping of the first cylindrical element and of the second cylindrical element, coaxially, respectively on the first portion and on the second portion of the shaft can prove complex and inaccurate. Furthermore, the first element and the second element can generate an out-of-balance upon the rotation of the shaft, which presents another notable problem.

The aim of the present invention is therefore to at least partly resolve these drawbacks by proposing a solution that is simple, reliable, effective and accurate for measuring the value of the torque applied to a drive shaft of a motor vehicle or of cycle type.

To this end, the subject of the invention is first of all an assembly formed by a drive shaft for a vehicle and a sensor for measuring the value of a torque applied to said drive shaft, said drive shaft comprising:
- a first cylindrical portion of a first diameter,
- a second cylindrical portion of a second diameter,
- an intermediate torsion portion linking the first portion and the second portion and with a section dimension less than the first diameter and the second diameter in order to concentrate a torsion generated by a torque applied to the shaft,
- a first toothed wheel mounted coaxially on the first portion, comprising, on its periphery, a plurality of teeth alternating with tooth spaces and with a period that corresponds to the length of the circular arc defined by a consecutive tooth and tooth space measured at the periphery of said tooth,
- a second toothed wheel, identical to the first toothed wheel, mounted coaxially on the second portion parallel to the first toothed wheel, said sensor comprising means for generating a magnetic field and an arrangement formed by a first coil, a second coil, a third coil and a fourth coil arranged side-by-side between the first toothed wheel and the second toothed wheel, parallel to said first toothed wheel and to said second toothed wheel, said arrangement being arranged to be immersed in said magnetic field and configured such that the overall length of the first coil, of the second coil, of the third coil and of the fourth coil is equal to the period of the first toothed wheel and of the second toothed wheel.

The first coil, the second coil, the third coil and the fourth coil each define, at their terminals, respectively, a first voltage, a second voltage, a third voltage and a fourth voltage, and it is then sufficient to compare, on the one hand, the sum of the absolute value of the difference between the first voltage and the third voltage and the absolute value of the difference between the second voltage and the fourth voltage to an initial value of said sum, measured previously in the absence of torsion of the shaft, to obtain a value of the aperture, that is to say of the angular displacement, between the first toothed wheel and the second toothed wheel representative of the value of a torque applied to the shaft. Furthermore, such an arrangement makes it possible to ensure that the sum of the first voltage, of the second voltage, of the third voltage and of the fourth voltage is constant whatever the torque applied to the drive shaft, which makes it possible in particular to easily calibrate the sensor. In effect since the signal measured by the sensor depends on the distance between the sensor and the first toothed wheel, on the one hand, and on the distance between the sensor and the second toothed wheel, on the other hand, any modification of these distances due to mechanical plays could falsify the measurement of the sensor. Now, the sum of the first voltage, of the second voltage, of the third voltage and of the fourth voltage varies also according to these distances but remains constant when these distances do not vary whatever the torsion value applied, which makes it possible to control the sensitivity of the sensor automatically so that it is no longer disturbed when these distances vary. Moreover, with the sensor according to the invention, the torque information is independent of the rotation of the shaft. Thus, for one and the same torque applied, the measured value is identical whether the shaft is rotating or not, and, when it is rotating, whatever the speed of rotation thereof.

The value of the aperture is proportional to the torsion applied to the shaft, which is itself proportional to the value of the torque applied to the shaft. Thus, a mapping table between the magnetic field perceived by the coils and the torque applied to the shaft can be used to supply the value of the torque applied to the shaft, this table being able to be established empirically. Such a torque value can then be used by a computer, for example to manage the operating parameters of the engine of a motor vehicle or of a motor-assisted bicycle.

It will be noted that the sensor according to the invention is advantageously a sensor of the "contactless sensor" type, that is to say that no electronic element of the sensor is mounted on the shaft, which makes it possible to make the sensor robust and reliable, particularly at high shaft rotation speeds.

It will also be noted that the use of two inductive sensors of resolver type which each measure the position of a target in order to deduce therefrom an annular offset would not have made it possible to measure the torque accurately. In effect, the resolver is a kind of small rotary transformer with generally, a primary coil and two secondary coils electrically offset by 90°. The primary coil is powered by a sinusoidal voltage such that the voltages at the terminals of the secondary coils are two sinusoids phase-shifted by 90° and whose phase-shift with the primary coil is the image of the angular position that is to be measured. Now, in the motor vehicle field in particular, there may be a requirement to measure the torque with an accuracy of less than 5% of the maximum torque value, which entails knowing the relative position of the two targets with great accuracy, for example less than 0.04°. The calibration difference between the two resolvers and the sum of the noises of the two sensors on the measurement would not however make it possible to achieve such a level of accuracy, particularly because the targets are moving when the torque varies.

In one embodiment of the sensor according to the invention, the arrangement of coils takes the form of an annular sector arranged between the first toothed wheel and the second toothed wheel, parallel to said first toothed wheel and to said second toothed wheel. This annular sector is defined by an outer radius and an inner radius, less than the outer radius, and is arranged facing the teeth of the first toothed wheel and of the second toothed wheel such that the length of the circular arc of the sector defined by its outer radius corresponds to the period of the first toothed wheel and of the second toothed wheel.

Preferably, the first toothed wheel and the second toothed wheel each comprise a first reference tooth, the first reference tooth of the first toothed wheel and the first reference tooth of the second toothed wheel are both facing the first coil over a portion of length that is non-zero and less than the period of the first toothed wheel and of the second toothed wheel so as to define an initial position corresponding to an absence of torsion of the shaft.

Such an initial position makes it possible to generate a non-zero value of the sum of the absolute value of the difference between the first voltage and the third voltage and of the absolute value of the difference between the second voltage and the fourth voltage which advantageously makes it possible to never have negative voltage signals to be measured. In effect, the calculation being done on absolute values, it would in this case be impossible to measure them.

The invention relates also to a vehicle comprising an assembly formed by a drive shaft for a vehicle and by a sensor for measuring the value of a torque applied to said shaft as presented previously.

The invention relates also to a method for determining a torque applied to a drive shaft of a vehicle, said method being implemented by an assembly as presented previously, the first coil, the second coil, the third coil and the fourth coil each defining at their terminals, respectively, a first voltage, a second voltage, a third voltage and a fourth voltage, said method comprising:
 a step of torsion of the shaft at its intermediate portion,
 a step of measurement of the first voltage, of the second voltage, of the third voltage and of the fourth voltage,
 a step of calculation of the sum of the absolute value of the difference between the first voltage and the third voltage and the absolute value of the difference between the second voltage and the fourth voltage,
 a step of comparison of the calculated sum with a predetermined value corresponding to an absence of torsion of the shaft so as to determine the value of the torque applied to the shaft.

Other features and advantages of the invention will become apparent from the following description in light of the attached figures given as nonlimiting examples and in which identical references are given to similar objects:

FIG. 1 schematically illustrates an embodiment of an assembly according to the invention formed by a drive shaft and a sensor.

The assembly 1 according to the invention, described hereinbelow with reference to FIGS. 1 to 5, is formed by a drive shaft 10 and a sensor 20 for measuring the value of a torque applied to said drive shaft 10.

Such a sensor 20, commonly called "torque sensor", is arranged to be mounted on a fixed housing 30 of a vehicle (not represented) in order to measure the torque of a drive shaft 10 of said vehicle.

This vehicle can for example be a motor vehicle or else a cycle such as, for example, an electric motor-assisted bicycle.

As an example, the drive shaft 10 can, in the case of a motor vehicle, be an engine power transmission shaft, a gearbox shaft, a crank shaft, or else, in the case of a bicycle, a pedal shaft.

Figure 1:
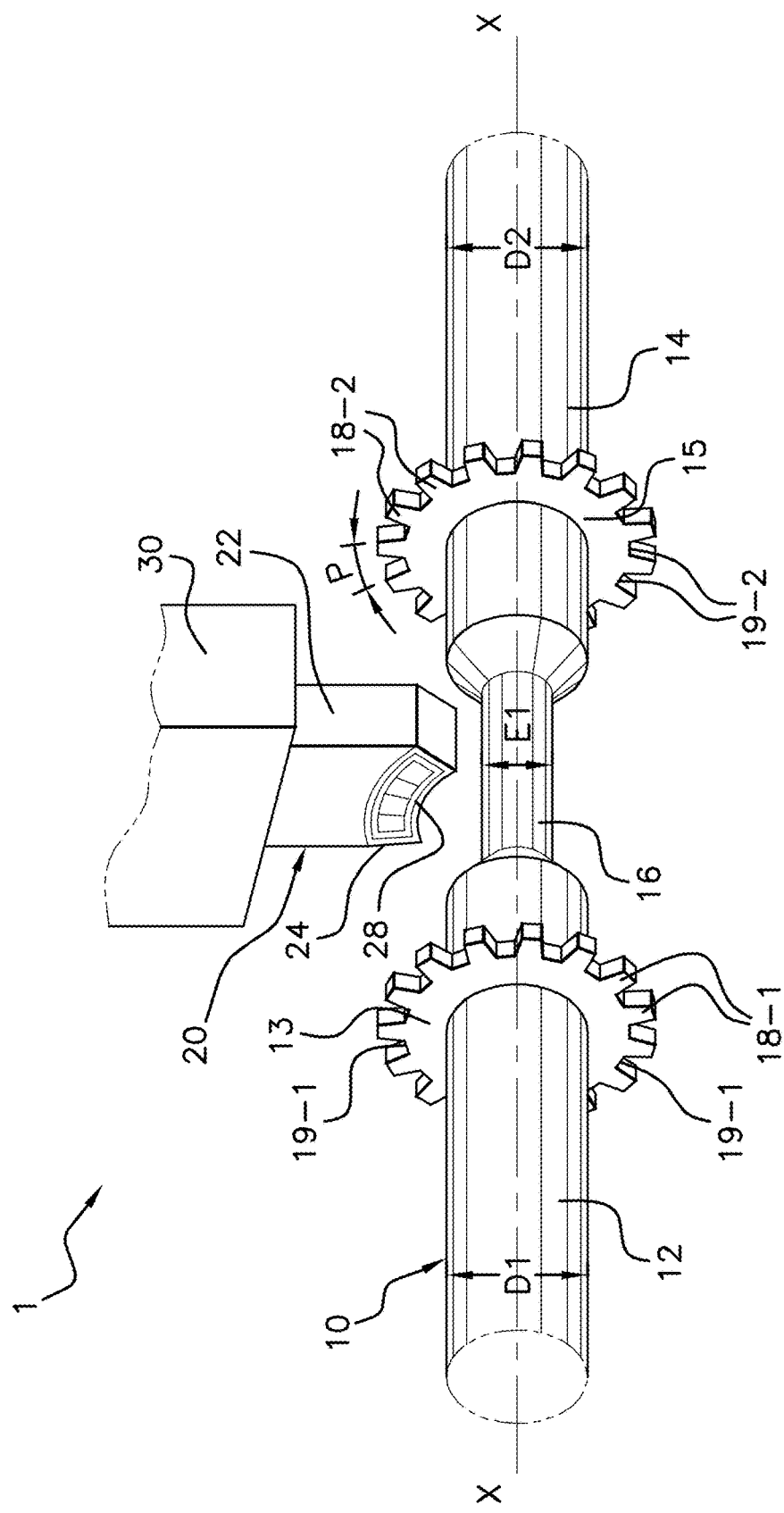

As illustrated in FIG. 1, the drive shaft 10 extends along a longitudinal axis XX and comprises a first cylindrical portion 12, a second cylindrical portion 14 and an intermediate torsion portion 16 linking the first portion 12 and the second portion 14.

The first cylindrical portion 12 of the drive shaft 10, of circular section of a first diameter D1, is intended to be linked to a first element (not represented) of the vehicle such as, for example, an engine, a gearbox, a pedal, etc.

Similarly, the second cylindrical portion 14, of circular section of a second diameter D2 being able to be equal to the first diameter D1, is intended to be linked to a second element (not represented) of the vehicle such as, for example, an engine, a gearbox, a pedal, etc.

The section of the intermediate torsion portion 16 can be circular, rectangular or of any other suitable form.

Still referring to FIG. 1, a thickness E1 of at least a part of said intermediate torsion portion 16 is less than the first diameter D1 of the first portion 12 and than the second diameter D2 of the second portion such that the intermediate portion 16 is arranged to undergo a torsional deformation when the drive shaft 10 is subjected to a couple of forces (i.e. when the drive shaft 10 is driven in rotation for example by an engine or pedals).

According to the invention, in order to make it possible to measure the torque which is applied to it by the sensor 20, the drive shaft 10 comprises a first toothed wheel 13 and a second toothed wheel 15, both metal.

The first toothed wheel 13 comprises, on its periphery, a plurality of teeth 18-1 alternating with tooth spaces 19-1 and is mounted coaxially on the first portion 12 of the drive shaft 10. In other words, the first toothed wheel 13 extends at right angles to the longitudinal axis XX of the drive shaft 10.

Similarly, the second toothed wheel 15 comprises, on its periphery, a plurality of teeth 18-2 alternating with tooth spaces 19-2 and is mounted coaxially on the second portion 14 of the drive shaft 10, parallel to the first toothed wheel 13 and facing the latter. In other words, the second toothed wheel 15 extends at right angles to the longitudinal axis XX of the drive shaft 10.

The first toothed wheel 13 and the second toothed wheel 15 are identical, notably in size and in number of teeth 18-1, 18-2. In this example, each of the first toothed wheel 13 and the second toothed wheel 15 comprises twelve teeth 18-1, 18-2 but it goes without saying that each of the first toothed wheel 13 and the second toothed wheel 15 could comprise more or less than twelve teeth 18-1, 18-2.

The period P of the first toothed wheel 13 and of the second toothed wheel 15 is defined as being the length, measured at the periphery of a tooth 18-1 of the first toothed wheel 13 (respectively of a tooth 18-2 of the second toothed wheel 15), of the circular arc delimiting a successive tooth 18-1, 18-2 and tooth space 19-1, 19-2.

Still referring to FIG. 1, the sensor 20 comprises a body 22 for fixing on the fixed housing 30 of the vehicle from which there extends protrudingly, between the first toothed wheel 13 and the second toothed wheel 15, a coil support 24. It goes without saying that this fixing body 22 and this coil support 24 can take any suitable form.

As illustrated in FIG. 1, this coil support 24 is a printed circuit taking the form of a flat plate whose form defines an annular sector and which extends between the first toothed wheel 13 and the second toothed wheel 15 parallel to the latter.

Figure 3:
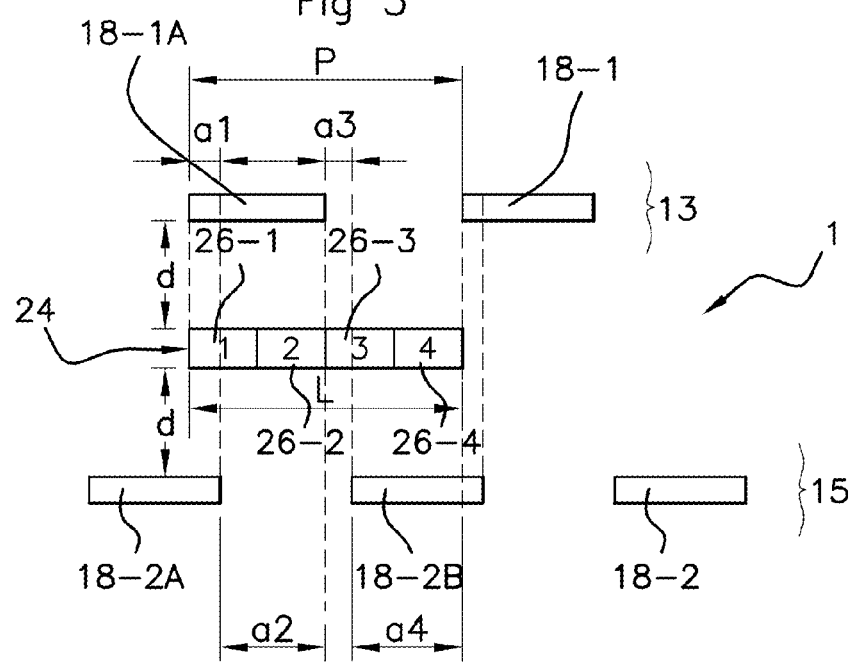
FIG. 3 is a schematic plan view of the arrangement of coils of FIG. 2 arranged between the first toothed wheel and the second toothed wheel of the shaft of FIG. 1 in the absence of a torsion of the shaft.
Figure 4:
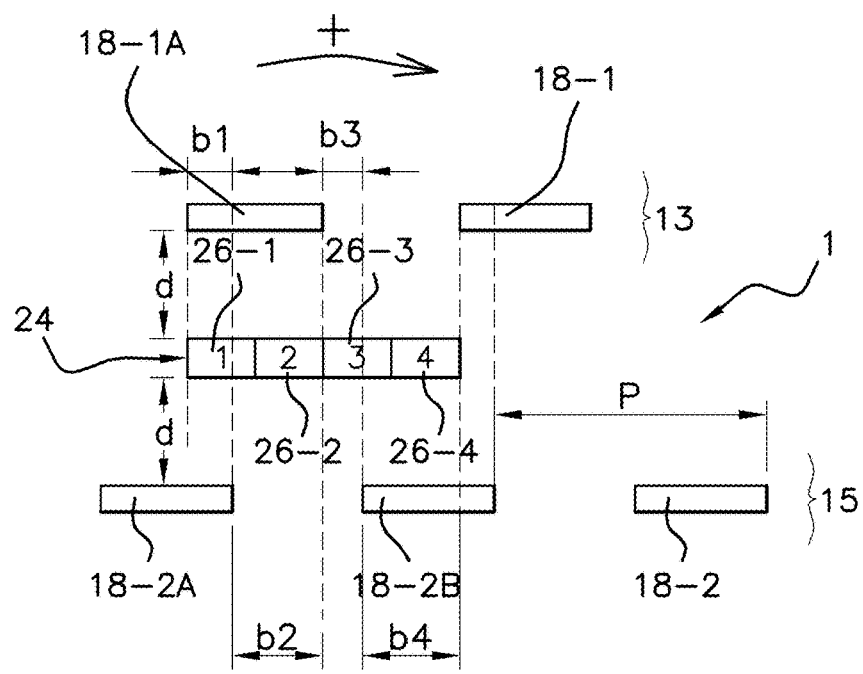
FIG. 4 is a schematic plan view of the arrangement of coils of FIG. 2 arranged between the first toothed wheel and the second toothed wheel of the shaft of FIG. 1 in the presence of a positive torsion of the shaft.
Figure 5:
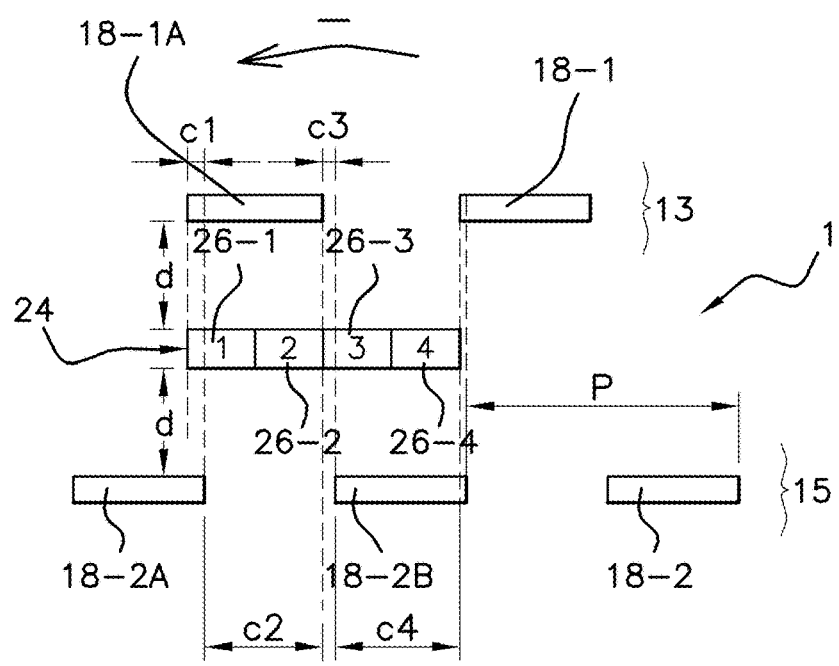
FIG. 5 is a schematic plan view of the arrangement of coils of FIG. 2 arranged between the first toothed wheel and the second toothed wheel of the shaft of FIG. 1 in the presence of a negative torsion of the shaft.

The coil support 24 is separated from the first toothed wheel 13 and from the second toothed wheel 15 by one and the same distance d (referring to FIGS. 3 to 5).

Figure 2:
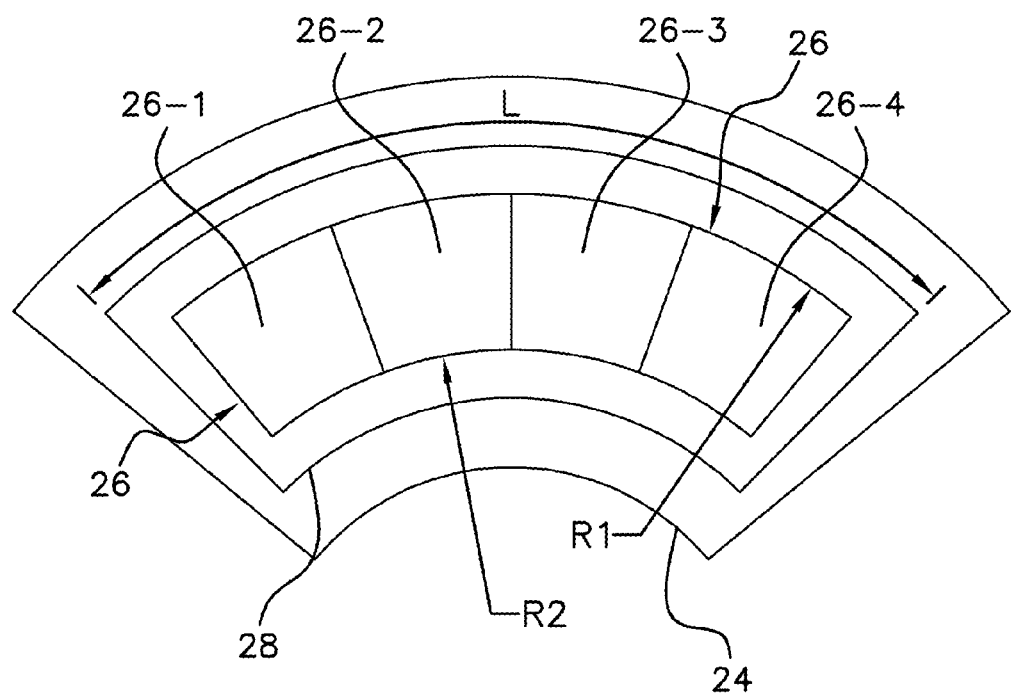
FIG. 2 is a schematic view of a support comprising an arrangement of coils of the sensor of FIG. 1.

Now referring to FIG. 2, this coil support 24 comprises, on one of its faces, an arrangement 26 of four identical coils, respectively a first coil 26-1, a second coil 26-2, a third coil 26-3 and a fourth coil 26-4, arranged side-by-side.

The first coil 26-1, the second coil 26-2, the third coil 26-3 and the fourth coil 26-4 each define at their terminals, respectively, a first voltage V1, a second voltage V2, a third voltage V3 and a fourth voltage V4.

Referring to FIGS. 2 to 5, this arrangement 26 of coils is in the form of an annular sector defined by an outer radius R1 and an inner radius R2, less than the outer radius R1, and is arranged facing the teeth 18-1, 18-2 respectively of the first toothed wheel 13 and of the second toothed wheel 15 such that the length L of the circular arc defined by the outer radius of the arrangement 26 corresponds to the period P of the first toothed wheel 13 and of the second toothed wheel 15.

As an example, when the first toothed wheel 13 and the second toothed wheel 15 each have twelve teeth 18-1, 18-2 evenly distributed on their periphery, each tooth 18-1, 18-2 covers an angular sector of 15° and each tooth space likewise covers an angular sector of 15°, thus defining a period P covering an angular sector of 30°. In this case, each of the coils of the arrangement 26 is configured to cover an angular sector of 7.5°, or a total of 30° for the arrangement of the four coils, corresponding to the period P of each of the first toothed wheel 13 and of the second toothed wheel 15.

The sensor 20 also comprises means for generating a magnetic field in the form of a fifth coil called "exciter" coil 28 configured to immerse the arrangement 26 in a magnetic field that it generates.

The invention will now be described in its implementation with reference to FIGS. 3 to 5.

In the absence of torque applied to the drive shaft 10, the initial position of the arrangement of coils 26, of the first toothed wheel 13 and of the second toothed wheel 15 is predetermined as illustrated in FIG. 3.

In this initial position given by way of example, a reference tooth 18-1A of the first toothed wheel 13 is arranged exactly facing the first coil 26-1 and the second coil 26-2, that is to say so as to extend exactly over the length of the first coil 26-1 and of the second coil 26-2, thus covering an angular sector of 15° in the example given above.

Moreover, still in this initial position, a portion of length a1 of a first reference tooth 18-2A of the second toothed wheel 15 is arranged facing the first coil 26-1 and therefore also the first reference tooth 18-1A of the first toothed wheel 13.

(a1+a2) denotes the length of the reference tooth 18-1A of the first toothed wheel 13, measured at its periphery, which is also equal to a half-period P/2 or to a half-length L/2 of the arrangement of coils 26.

The result thereof, as illustrated in FIG. 3, is that a portion of length a3 of the third coil 26-3 is not facing any tooth 18-1 of the first toothed wheel 13, or of the second toothed wheel 15 and that a portion of length a4 of a second reference tooth 18-2B of the second toothed wheel 15, consecutive to the first reference tooth 18-2A of the second toothed wheel 15, is arranged facing a portion of the third coil 26-3 and of all of the fourth coil 26-4.

In summary, the first reference tooth 18-1A of the first toothed wheel 13 and the first reference tooth 18-2A of the second toothed wheel 15 are facing the first coil 26-1 over a length a1, the first reference tooth 18-1A of the first toothed wheel 13 is the only one facing the first coil 26-1 and the second coil 26-2 over a length a2, no tooth 18-1, 18-2 is facing the third coil over a length a3 and the second reference tooth 18-2B of the second toothed wheel 15 is the only one facing the third coil 26-3 and the fourth coil 26-4 over a length a4.

The angular offset between the first toothed wheel 13 and the second toothed wheel 15 depends on the torque applied to the drive shaft 10.

This angular offset, called "aperture", varies the quantity of magnetic field received by the receiving first coil 26-1, second coil 26-2, third coil 26-3 and fourth coil 26-4 in proportion to the value of the torsion (and therefore of the torque applied) and varies the first voltage V1, the second voltage V2, the third voltage V3 and the fourth voltage V4.

In effect, a piece of metal immersed in a magnetic field will generate, on its surface, eddy currents which will have the effect of creating a magnetic field which opposes the magnetic field which created it. The effect is that the magnetic field seen at the level of the receiving first coil 26-1, second coil 26-2, third coil 26-3 and fourth coil 26-4 will be weaker in the presence of a piece of metal (teeth 18-1A, 18-2A, 18-2B) and therefore the measured signal will be weaker in the presence of the tooth 18-1A, 18-2A, 18-2B than in its absence.

Thus, the magnetic field received by the arrangement of coils 26 in the presence of the portions of the first reference tooth 18-1A of the first toothed wheel 13 or of the second reference tooth 18-2B which are each the only one facing the arrangement of coils 26 (portions of length a2 and a4) is for example 20% weaker than the magnetic field received in the absence of a tooth 18-1A, 18-2A, 18-2B facing the arrangement 26.

Similarly, the magnetic field received by the arrangement of coils 26 in the presence of the portions of the first reference tooth 18-1A of the first toothed wheel 13 and of the first reference tooth 18-2B of the second toothed wheel 15 which are both facing the arrangement of coils 26 (portion of length a1) is for example 40% weaker than the magnetic field received in the absence of a tooth 18-1A, 18-2A, 18-2B facing the arrangement 26.

On the other hand, the magnetic field received by the part of the arrangement of coils 26 which is not facing any tooth 18-1A, 18-2A, 18-2B, in this case the part of length a3, is not weakened because of the absence of a tooth 18-1A, 18-2A, 18-2B.

The result thereof is that the sum of the absolute value of the difference between the first voltage V1 and the third voltage V3 and of the absolute value of the difference between the second voltage V2 and the fourth voltage V4 is equal to a predetermined reference value which corresponds to a zero value (0°) of torsion of the drive shaft 10.

When the shaft 10 is subjected to a torsion of the shaft at its intermediate portion 16, the first step will be to measure the first voltage, the second voltage, the third voltage and the fourth voltage and then to calculate the sum of the absolute value of the difference between the first voltage and the third voltage and the absolute value of the difference between the second voltage and the fourth voltage.

Finally, the duly calculated sum is compared with the predetermined value corresponding to an absence of torsion of the shaft 10 (initial position) so as to determine the value of the torque applied to the shaft 10.

Since the value of the aperture is proportional to the torsion applied to the shaft which is itself proportional to the value of the torque applied to the shaft, it is for example possible to determine the torque by using a mapping table between the magnetic field perceived by the coils and the torque applied to the shaft. Such a table can be established empirically. It goes without saying that the use of a mapping table is not limiting on the scope of the present invention and that any suitable means making it possible to determine the torque applied from the comparison of voltages performed can be used.

Once determined, the value of the torque can be used by a computer, notably to manage the operating parameters of the vehicle engine.

Referring to FIG. 4, when the drive shaft 10 is subjected to a torque generating a positive torsion (i.e. in the clockwise direction), the torsion to which the shaft 10 is subjected is concentrated at the intermediate torsion portion 16 such that the first toothed wheel 13 and the second toothed wheel 15 are displaced angularly in relation to one another and in relation to the arrangement of coils 26.

Thus, in the example given in FIG. 4, the torsion of the intermediate portion of the shaft 10 has driven the second toothed wheel 15 to the right in relation to the initial position such that:

- the first reference tooth 18-2A of the second toothed wheel 15 is now located facing the first coil 26-1 over a length b1 greater than the length a1,
- the first reference tooth 18-1A of the first toothed wheel 13 is located as the only one facing the first coil 26-1 and the second coil 26-2 over a length b2 less than the length a2,
- no tooth 18-1, 18-2 is located facing the third coil over a length b3 greater than the length a3,
- the second reference tooth 18-2B of the second toothed wheel 15 is located as the only one facing the third coil 26-3 and the fourth coil 26-4 over a length b4, less than the length a4.

A positive torsion of the drive shaft 10 varies the sum of the absolute value of the difference between the first voltage V1 and the third voltage V3 and of the absolute value of the difference between the second voltage V2 and the fourth voltage V4 to a value greater than the predetermined reference value which corresponds to an intermediate value of positive torsion of the shaft, for example lying between 0° and 4° according to the mapping table.

In the presence of a predetermined maximum torsion of the drive shaft 10, the sum of the absolute value of the difference between the first voltage V1 and the third voltage V3 and of the absolute value of the difference between the second voltage V2 and the fourth voltage V4 is equal to a maximum value, greater than the predetermined reference value, which corresponds to a predetermined maximum value of torsion of the shaft, for example 4° which corresponds to a predetermined torque value according to the mapping table.

Now referring to FIG. 5, when the drive shaft 10 is subjected to a torque generating a negative torsion (i.e. in the counter-clockwise direction), the torsion to which the shaft 10 is subjected is concentrated at the intermediate torsion portion 16 such that the first toothed wheel 13 and the second toothed wheel 15 are angularly displaced in relation to one another and in relation to the arrangement of coils 26, in the direction opposite to that generated by a positive torsion.

Thus, in the example given in FIG. 5, the torsion of the intermediate portion of the shaft 10 has driven the second toothed wheel 15 to the left in relation to the initial position such that:

the first reference tooth 18-2A of the second toothed wheel 15 is now located facing the first coil 26-1 over a length c1 less than the length a1, the first reference tooth 18-1A of the first toothed wheel 13 is located as the only one facing the first coil 26-1 and the second coil 26-2 over a length c2 greater than the length a2, no tooth 18-1, 18-2 is facing the third coil over a length c3 less than the length a3, the second reference tooth 18-2B of the second toothed wheel 15 is the only one facing the third coil 26-3 and the fourth coil 26-4 over a length c4, greater than the length a4.

Still referring to FIG. 5, a negative torsion of the drive shaft 10 varies the sum of the absolute value of the difference between the first voltage V1 and the third voltage V3 and of the absolute value of the difference between the second voltage V2 and the fourth voltage V4 to a value less than the predetermined reference value which corresponds to an intermediate value of negative torsion of the shaft, for example lying between 0° and −4° according to the mapping table.

It will be noted that the offset used in the initial position between the first reference tooth 18-1A of the first toothed wheel 13 and the first reference tooth 18-2B of the second toothed wheel 15 defined by the length a1, makes it possible to have an overlap between the first reference tooth 18-1A of the first toothed wheel 13 and the first reference tooth 18-2B of the second toothed wheel 15 which generates a non-zero value of the sum of the absolute value of the difference between the first voltage V1 and the third voltage V3 and of the absolute value of the difference between the second voltage V2 and the fourth voltage V4. This is advantageous because the calculations in absolute values and thus the measured value of the torque is independent of the rotation of the shaft.

With the assembly according to the invention, it will also be noted that, in the three cases (zero torsion, positive torsion, negative torsion), the sum of the first voltage V1, of the second voltage V2, of the third voltage V3 and of the fourth voltage V4 is constant whatever the torsion applied to the drive shaft 10, with a distance d that is constant between the coil support 24 and, on the one hand, the first toothed wheel 13 and, on the other hand, the second toothed wheel 15. In effect, since the signal measured by the sensor depends on the distance between the sensor and the first toothed wheel, on the one hand, and on the distance between the sensor and the second toothed wheel, on the other hand, any modification of these distances due to mechanical plays could falsify the measurement of the sensor. Now, the sum of the first voltage, of the second voltage, of the third voltage and of the fourth voltage varies also according to these distances but remains constant when these distances do not vary, which makes it possible to control the sensitivity of the sensor automatically in order for it to be no longer disturbed when these distances vary.

It will be noted that if the distance d between, on the one hand, the first toothed wheel and the coil support 24 and, on the other hand, between the second toothed wheel and the coil support 24, varies, then the average of the sum varies but the measured torque remains the same with equal torsion.

It should finally be noted that the present invention is not limited to the examples described above and is open to numerous variants accessible to a person skilled in the art. In particular, the form and the dimensions of the drive shaft 10, of the first toothed wheel 13, of the second toothed wheel 15, of the body 22 of the arrangement of coils 26 of the sensor 20 and the number of teeth of the first toothed wheel 13 and of the second toothed wheel 15 as represented in the figures to illustrate an exemplary embodiment of the invention, should not be interpreted as limiting.

The invention claimed is:

1. An assembly formed by a drive shaft (10) for a vehicle and a sensor (20) for measuring the value of a torque applied to said drive shaft (10), said drive shaft (10) comprising:
a first cylindrical portion (12) of a first diameter (D1),
a second cylindrical portion (14) of a second diameter (D2),
an intermediate torsion portion (16) linking the first portion (12) and the second portion (14) and with a section dimension less than the first diameter (D1) and the second diameter (D2) in order to concentrate a torsion generated by a torque applied to the shaft (10),
a first toothed wheel (13) mounted coaxially on the first portion (12), comprising, on its periphery, a plurality of teeth (18-1) alternating with tooth spaces and with a period (P) that corresponds to the length of the circular arc defined by a consecutive tooth (18-1) and tooth space (19-1) measured at the periphery of said tooth (18-1),
a second toothed wheel (15), identical to the first toothed wheel (13), mounted coaxially on the second portion (14) parallel to the first toothed wheel (13),
said sensor (20) comprising means for generating a magnetic field and an arrangement (26) formed by a first coil (26-1), a second coil (26-2), a third coil (26-3) and a fourth coil (26-4) arranged side-by-side between the first toothed wheel (13) and the second toothed wheel (15), parallel to said first toothed wheel (13) and to said second toothed wheel (15), said arrangement (26) being arranged to be immersed in said magnetic field and configured such that the overall length of the first coil (26-1), of the second coil (26-2), of the third coil (26-3) and of the fourth coil (26-4) is equal to the period (P) of the first toothed wheel (13) and of the second toothed wheel (15).

2. The assembly as claimed in claim 1, in which the arrangement (26) takes the form of an annular sector arranged between the first toothed wheel (13) and the second toothed wheel (15), parallel to said first toothed wheel (13) and to said second toothed wheel (15).

3. The assembly as claimed in claim 2, in which the annular sector is defined by an outer radius (R1) and an inner radius (R2), less than the outer radius (R1), and is arranged facing the teeth (18-1, 18-2) of the first toothed wheel (13) and of the second toothed wheel (15) such that the length (L) of the circular arc of the sector defined by its outer radius (R1) corresponds to the period (P) of the first toothed wheel (13) and of the second toothed wheel (15).

4. The assembly as claimed in claim 3, in which the first toothed wheel (13) and the second toothed wheel (15) each comprise a first reference tooth (18-1A, 18-2A), the first reference tooth (18-1A) of the first toothed wheel (13) and the first reference tooth (18-2A) of the second toothed wheel (15) are both facing the first coil (26-1) over a portion of length (al) that is non-zero and less than the period (P) of the first toothed wheel (13) and of the second toothed wheel (15) so as to define an initial position corresponding to an absence of torsion of the shaft (10).

5. A vehicle comprising an assembly formed by a drive shaft (10) for a vehicle and a sensor (20) for measuring the value of a torque applied to said shaft (10) as claimed in claim 4.

6. A method for determining a torque applied to a drive shaft (10) of a vehicle, said method being implemented by an assembly as claimed in claim 4, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
 - a step of torsion of the shaft (10) at its intermediate portion (16),
 - a step of measurement of the first voltage (V1), of the second voltage (V2), of the third voltage (V3) and of the fourth voltage (V4),
 - a step of calculation of the sum of the absolute value of the difference between the first voltage (V1) and the third voltage (V3) and the absolute value of the difference between the second voltage (V2) and the fourth voltage (V4),
 - a step of comparison of the calculated sum with a predetermined value corresponding to an absence of torsion of the shaft (10) so as to determine the value of the torque applied to the shaft (10).

7. A vehicle comprising an assembly formed by a drive shaft (10) for a vehicle and a sensor (20) for measuring the value of a torque applied to said shaft (10) as claimed in claim 3.

8. A method for determining a torque applied to a drive shaft (10) of a vehicle, said method being implemented by an assembly as claimed in claim 3, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
 - a step of torsion of the shaft (10) at its intermediate portion (16),
 - a step of measurement of the first voltage (V1), of the second voltage (V2), of the third voltage (V3) and of the fourth voltage (V4),
 - a step of calculation of the sum of the absolute value of the difference between the first voltage (V1) and the third voltage (V3) and the absolute value of the difference between the second voltage (V2) and the fourth voltage (V4),
 - a step of comparison of the calculated sum with a predetermined value corresponding to an absence of torsion of the shaft (10) so as to determine the value of the torque applied to the shaft (10).

9. The assembly as claimed in claim 2, in which the first toothed wheel (13) and the second toothed wheel (15) each comprise a first reference tooth (18-1A, 18-2A), the first reference tooth (18-1A) of the first toothed wheel (13) and the first reference tooth (18-2A) of the second toothed wheel (15) are both facing the first coil (26-1) over a portion of length (al) that is non-zero and less than the period (P) of the first toothed wheel (13) and of the second toothed wheel (15) so as to define an initial position corresponding to an absence of torsion of the shaft (10).

10. A vehicle comprising an assembly formed by a drive shaft (10) for a vehicle and a sensor (20) for measuring the value of a torque applied to said shaft (10) as claimed in claim 9.

11. A method for determining a torque applied to a drive shaft (10) of a vehicle, said method being implemented by an assembly as claimed in claim 9, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
 - a step of torsion of the shaft (10) at its intermediate portion (16),
 - a step of measurement of the first voltage (V1), of the second voltage (V2), of the third voltage (V3) and of the fourth voltage (V4),
 - a step of calculation of the sum of the absolute value of the difference between the first voltage (V1) and the third voltage (V3) and the absolute value of the difference between the second voltage (V2) and the fourth voltage (V4),
 - a step of comparison of the calculated sum with a predetermined value corresponding to an absence of torsion of the shaft (10) so as to determine the value of the torque applied to the shaft (10).

12. A vehicle comprising an assembly formed by a drive shaft (10) for a vehicle and a sensor (20) for measuring the value of a torque applied to said shaft (10) as claimed in claim 2.

13. A method for determining a torque applied to a drive shaft (10) of a vehicle, said method being implemented by an assembly as claimed in claim 2, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
 - a step of torsion of the shaft (10) at its intermediate portion (16),
 - a step of measurement of the first voltage (V1), of the second voltage (V2), of the third voltage (V3) and of the fourth voltage (V4),
 - a step of calculation of the sum of the absolute value of the difference between the first voltage (V1) and the third voltage (V3) and the absolute value of the difference between the second voltage (V2) and the fourth voltage (V4),
 - a step of comparison of the calculated sum with a predetermined value corresponding to an absence of torsion of the shaft (10) so as to determine the value of the torque applied to the shaft (10).

14. The assembly as claimed in claim 1, in which the first toothed wheel (13) and the second toothed wheel (15) each comprise a first reference tooth (18-1A, 18-2A), the first reference tooth (18-1A) of the first toothed wheel (13) and the first reference tooth (18-2A) of the second toothed wheel (15) are both facing the first coil (26-1) over a portion of length (al) that is non-zero and less than the period (P) of the first toothed wheel (13) and of the second toothed wheel (15) so as to define an initial position corresponding to an absence of torsion of the shaft (10).

15. A vehicle comprising an assembly formed by a drive shaft (10) for a vehicle and a sensor (20) for measuring the value of a torque applied to said shaft (10) as claimed in claim 14.

16. A method for determining a torque applied to a drive shaft (10) of a vehicle, said method being implemented by an assembly as claimed in claim 14, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
- a step of torsion of the shaft (10) at its intermediate portion (16),
- a step of measurement of the first voltage (V1), of the second voltage (V2), of the third voltage (V3) and of the fourth voltage (V4),
- a step of calculation of the sum of the absolute value of the difference between the first voltage (V1) and the third voltage (V3) and the absolute value of the difference between the second voltage (V2) and the fourth voltage (V4),
- a step of comparison of the calculated sum with a predetermined value corresponding to an absence of torsion of the shaft (10) so as to determine the value of the torque applied to the shaft (10).

17. A vehicle comprising an assembly formed by a drive shaft (10) for a vehicle and a sensor (20) for measuring the value of a torque applied to said shaft (10) as claimed in claim 1.

18. A method for determining a torque applied to a drive shaft (10) of a vehicle, said method being implemented by an assembly as claimed in claim 1, the first coil (26-1), the second coil (26-2), the third coil (26-3) and the fourth coil (26-4) each defining at their terminals, respectively, a first voltage (V1), a second voltage (V2), a third voltage (V3) and a fourth voltage (V4), said method comprising:
- a step of torsion of the shaft (10) at its intermediate portion (16),
- a step of measurement of the first voltage (V1), of the second voltage (V2), of the third voltage (V3) and of the fourth voltage (V4),
- a step of calculation of the sum of the absolute value of the difference between the first voltage (V1) and the third voltage (V3) and the absolute value of the difference between the second voltage (V2) and the fourth voltage (V4),
- a step of comparison of the calculated sum with a predetermined value corresponding to an absence of torsion of the shaft (10) so as to determine the value of the torque applied to the shaft (10).

* * * * *